US005155335A

United States Patent [19]

Habaki et al.

[11] Patent Number: 5,155,335

[45] Date of Patent: Oct. 13, 1992

[54] FURNACE FOR BAKING COATING POWDER

[75] Inventors: Kiyota Habaki, Nara; Iyuki Watanabe, Tondabayashi; Tsutomu Itoh, Musashino; Masakatsu Deguchi, Nishinomiya; Katsuya Itoh, Hirakata, all of Japan

[73] Assignees: Shoei Manufacturing Co., Ltd., Osaka; Onoda Cement Co. Ltd., Onoda, both of Japan

[21] Appl. No.: 595,959

[22] Filed: Oct. 11, 1990

[30] Foreign Application Priority Data

Oct. 11, 1989 [JP] Japan ................................ 1-264744

[51] Int. Cl.[5] .......................... F27B 9/08; A21B 1/26

[52] U.S. Cl. .................................... 219/388; 219/400; 118/642; 118/643; 118/725

[58] Field of Search ...................... 219/388, 400, 390; 34/177, 197; 432/132, 143, 147, 162, 594, 144, 152; 118/643, 642, 725, 620, 621; 126/21 A, 21 R, 39 BA, 90 R, 92 A, 400

[56] References Cited

U.S. PATENT DOCUMENTS

| | | | |
|---|---|---|---|
| 2,062,642 | 12/1936 | Darrah | 432/155 |
| 2,997,510 | 8/1961 | Gier, Jr. | 219/400 |
| 3,127,499 | 3/1964 | Savio et al. | 219/400 |
| 3,215,816 | 11/1965 | Perl | 219/400 |
| 3,229,070 | 1/1966 | Wells | 219/377 |
| 3,313,917 | 4/1967 | Ditzler et al. | 219/400 |
| 4,069,790 | 1/1978 | Witte | 118/70 |
| 4,257,172 | 3/1981 | Townsend | 34/68 |
| 4,366,177 | 12/1982 | Wells et al. | 219/388 |
| 4,389,562 | 6/1983 | Chaudoir | 219/388 |
| 4,591,333 | 5/1986 | Henke | 126/21 A |

OTHER PUBLICATIONS

Saiwai Shobo, "Latest Industrial Coating Technique", Aug. 8, 1977.

*Primary Examiner*—Bruce A. Reynolds
*Assistant Examiner*—Tuan Vinh To
*Attorney, Agent, or Firm*—Price, Heneveld, Cooper, DeWitt & Litton

[57] ABSTRACT

An oven for baking a powdered coating material to an object has an inlet air-shield chamber connected to the inlet side of a horizontal heating chamber. The inlet air-shield chamber is provided therein with a radiation heat source which heats the object and the layer of coating powder to a temperature substantially equal to the baking temperature before the object enters the horizontal heating chamber.

9 Claims, 4 Drawing Sheets

FURNACE FOR BAKING COATING POWDER

BACKGROUND OF THE INVENTION

1. Field of the Invention

The present invention broadly relates to an apparatus for applying a coating powder to the surfaces of objects such as household electric appliances and other ordinary machines. More particularly, the present invention is concerned with a baking oven for heating a layer of powdered coating material electrostatically deposited on the surface of the object together with the object so as to form a coating film of the coating material.

2. Description of the Related Art

A typical conventional baking oven, known as mountain-shaped oven, has a tunnel-like flat heating chamber and inlet and outlet air-shield chambers connected to the inlet and outlet sides of the heating chamber so as to extend obliquely downward therefrom. A flexible conveyor is attached to the ceiling of these chambers so as to extend through these chambers. The inlet and outlet air shielding chambers which are extended obliquely downward effectively prevent hot air in the horizontal heating chamber from flowing outside by natural convection. In operation, the the object is heated by hot air from the room temperature to the temperature required for the baking of the coating material while it runs through upstream region of the space inside the horizontal heating chamber. Then the object is maintained at the baking temperature for a predetermined time which is necessary for baking the coating material, during running through the remainder region of the .space inside the heating chamber. In order to maintain the object at the baking temperature for the required length of time, it would be possible to reduce the running speed of the object. Such a reduced running speed, however, impractically hampers the mass-producibility of the product. Consequently, the mountain-type oven is required to have a considerably large length. When the length of the oven is limited, it is necessary to enhance the heat transfer rate by convection by increasing the number of the cycle of circulation of hot air in the oven. In case of the powder coating, the powder layer has not been fused in the region near the inlet of the furnace. The powder particles of the layer, therefore, are scattered when the velocity of the hot air is increased. Thus, the number of cycles of recirculation of hot air also is limited.

SUMMARY OF THE INVENTION

Accordingly, an object of the present invention is to provide an oven for baking powdered coating material in which the heating of the object from the normal temperature up to the baking temperature is conducted while the material is still outside the oven so as to enable the number of cycles of recirculation of hot air to be increased, thus reducing the length of the hot air oven and, hence, the production cost and running cost of the oven, thereby overcoming the above-described problems of the prior art.

To this end, according to the present invention, there is provided an oven for baking a powdered coating material to the surface of an object, comprising: a tunnel-like horizontal heating chamber; an inlet air-shield chamber connected to the inlet end of the horizontal heating chamber so as to extend obliquely downward therefrom; an outlet air-shield chamber connected to the outlet end of the horizontal heating chamber so as to extend obliquely downward therefrom; a hot air generator connected to the horizontal heating chamber; a flexible conveyor arranged along the ceilings of the inlet air-shield chamber, the horizontal heating chamber and the outlet air-shield chamber so as to extend through these chambers; and a radiation heat source provided on the inner surface of the inlet air-shield chamber.

In operation, the object to be coated and a layer of the coating powder electrostatically deposited to the object are heated by the radiation heat source in the inlet air-shield chamber up to a temperature substantially equal to the baking temperature before entering the horizontal heating chamber. The object and the layer of the coating powder thus heated up are then brought into the horizontal heating chamber so as to be maintained at the baking temperature by a forced convection of hot air.

DESCRIPTION OF THE PREFERRED EMBODIMENT

Figure 3:
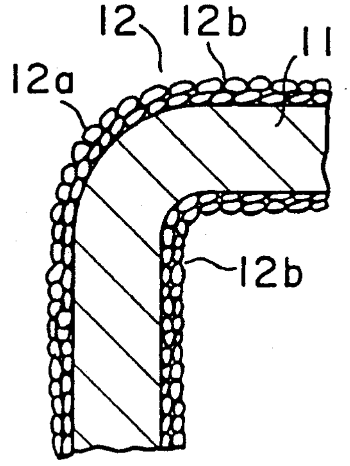
FIG. 3 is an enlarged sectional view of an object to be coated as shown in FIG. 1.

A preferred embodiment of the present invention will be described with reference to the accompanying drawings. A coating powder baking oven of the present invention has a tunnel-like horizontal heating chamber 1 to both ends of which are connected an inlet air-shield chamber 2 and an outlet air-shield chamber 3 so as to extend obliquely downward. A hot air generator 4 having a burner 4*a* is connected to the tunnel-like horizontal heating chamber 1 through a hot-air duct 16, a circulation fan 17 and a circulation duct 18 so that hot air generated in the hot air generator 4 is supplied into the horizontal heating chamber 1. The hot air which has passed through the horizontal heating chamber 1 is returned through a recirculation duct 18 having a recirculation blower 17 to the hot air generator 4 so as to be recirculated. A flexible conveyor 8 is suspended through guide rails 8*a* from the ceilings of the inlet air-shield chamber, the horizontal heating chamber and the outlet air-shield chamber so as to extend through these chambers. Hangers 11*a* are suspended from the flexible conveyor 8 at a suitable interval. Pieces of object 11 to be coated, each having a layer of a coating powder electrostatically deposited thereto, are suspended by these hangers 11*a* so as to be moved from the lower end of the inlet air-shield chamber 2 towards the outlet air-shield chamber 3 through the horizontal heating chamber 1 so that each piece of the object 11 is heated together with the layer of the coating powder during traveling through the horizontal hating chamber 1. A radiation heat source such as an infrared heater 10 is disposed in a region inside the inlet air-shield chamber 2 adjacent the horizontal heating chamber. Therefore, the coating powder 12, as well as numerous voids 12b existing among the grains of the coating material as shown in FIG. 3, is heated by the infrared heater 10 before the object 11 enters the horizontal heating chamber. Owing to specific heating characteristics of infrared rays, the coating powder 12 and the object 1 under the coating material 12 are effectively heated up to a temperature near the baking temperature while the object 11 is still in the inlet air-shield chamber 2.

Figure 4:
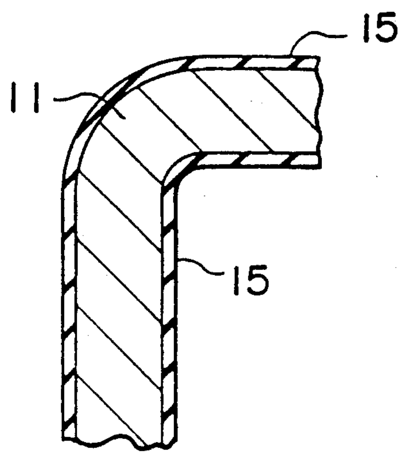
FIG. 4 is a sectional view of the portion of the object shown in FIG. 3 in a different state.

The object 11 then enters the horizontal heating chamber 1 in which the object 11 is heated by convection heating so as to be maintained for a predetermined time at the baking temperature necessary for allowing curing or setting of the coating powder 12, so that the coating powder is completely set to form a coating film 15 as shown in FIG. 4. The material is then delivered to the exterior of the oven through the outlet air-shield chamber 3.

As will be understood from the foregoing description, according to the present invention, the heating of the object from the normal temperature up to the baking temperature is conducted while the object to be coated is still in the inlet air-shield chamber 2, unlike the conventional oven in which the heating of the object up to the baking temperature is conducted in the horizontal heating chamber and in which the inlet air-shield chamber is used for the shielding purpose alone. Consequently, the oven in accordance with the present invention can have a length $l_1$, which is shorter than the length $L_1$ of the conventional oven shown in FIG. 5. Thus, the overall horizontal length l of the oven, which is the sum of the horizontal length $l_2$, the length $l_1$ of the horizontal heating chamber 1 and the horizontal length $l_3$ of the outlet air-shield chamber 3, can be reduced as compared with the overall length L of the baking oven shown in FIG. 5.

Figure 5:
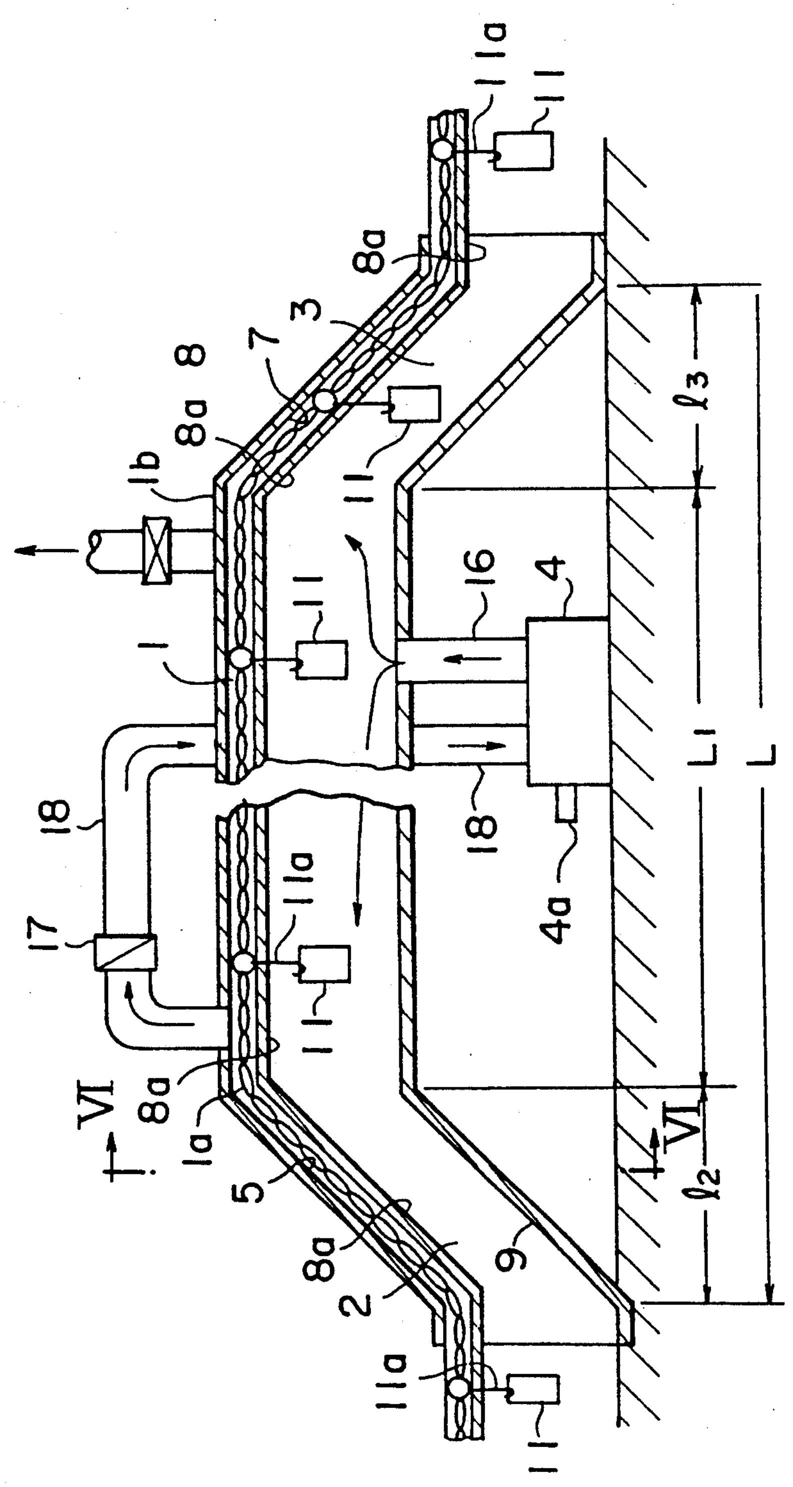
FIG. 5 PRIOR ART
FIG. 5 is a longitudinal sectional view of a conventional coating powder baking furnace.
Figure 6:
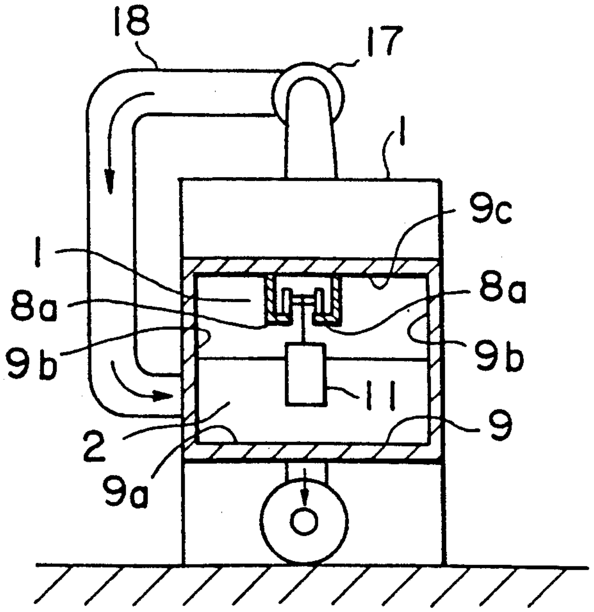
F I G. 6 PRIOR ART
FIG. 6 is a sectional view taken along the line VI—VI of FIG. 5.

In FIGS. 5 and 6 showing a prior art, the same reference numerals are used to denote the same parts or members as those appearing in FIGS. 1 to 4, and the parts or members denoted by the same numerals have the same names and functions.

Although a preferred embodiment has been described, it is to be understood that the described embodiment is only illustrative and various changes and modifications may be imparted thereto without departing from the scope of the invention. For instance, the infrared heater used as the radiation heat source may be substituted by a heater capable of radiating rays of wavelengths which are selected from a wide range including far-infrared and visible ray wavelengths in accordance with the type of the object to be coated or the coating powder.

It is also possible to provide a heat-resistant protective net 10a at an inclination above the upper side of the radiation heat source. Such a heat-resistant protective net can catch an object accidentally dropping from the conveyer, if any, and allows such object to roll to the lower end of the inlet air-shield chamber, thus preventing burning of the object.

Figure 1:
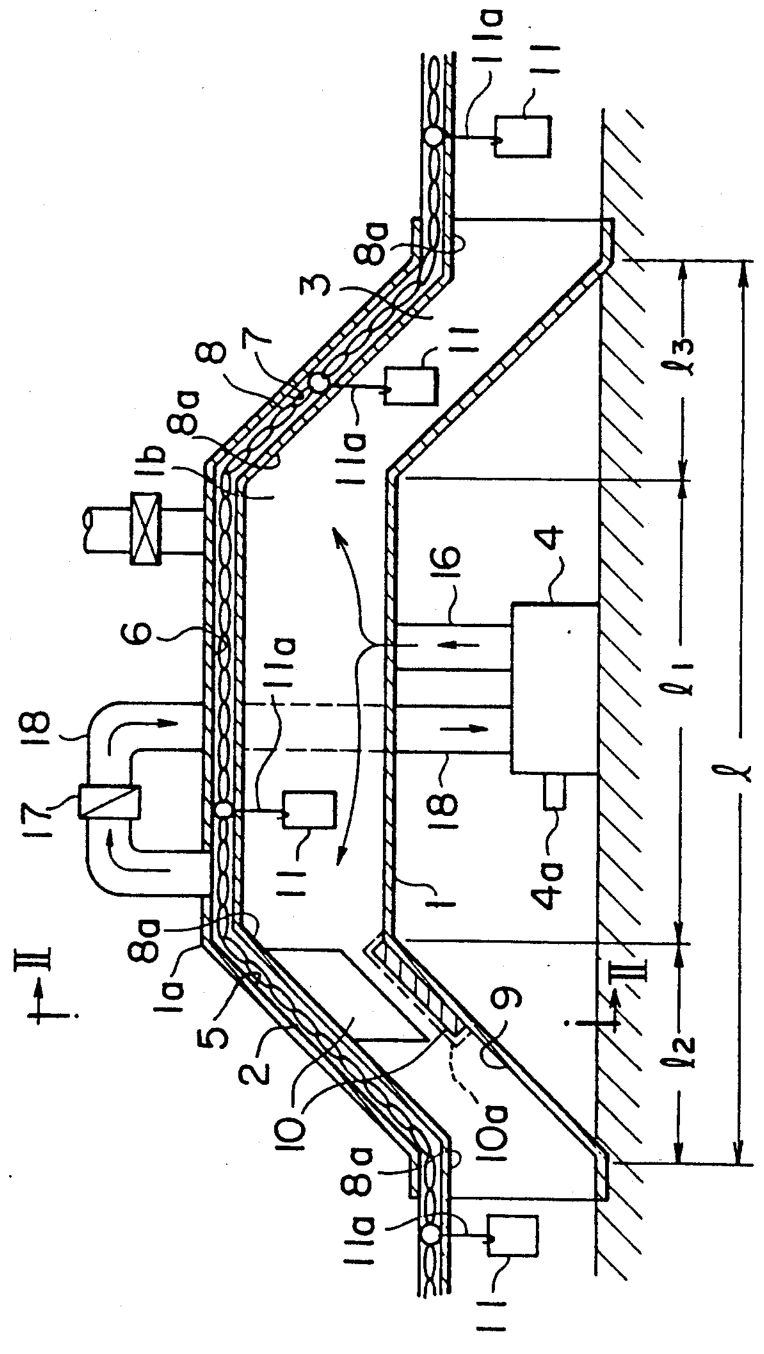
FIG. 1 is a longitudinal sectional view of an embodiment of the coating powder baking oven in accordance with the present invention.
Figure 2:
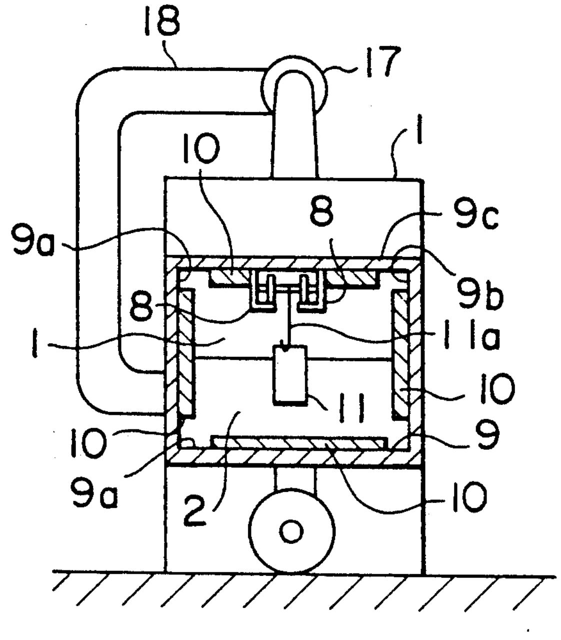
FIG. 2 is a sectional view taken along the line II—II of FIG. 2.

In the embodiment shown in FIGS. 1 and 2, the infrared heater 10 is disposed over the entire circumference of the inner surface of the inlet air-shield chamber in the region adjacent the horizontal heating chamber 1. This, however, is only illustrative and the infrared heater 10 may be disposed only at bottom and both side portions of the inner surface of the inlet air-shield chamber 2 as at 9a and 9b or only on the bottom as at 9a. The infrared heater provided on the bottom 9a effectively raises the air temperature in the horizontal heating chamber, thus preventing the hot air in the horizontal heating chamber 1 from escaping to the exterior through the inlet air-shield chamber 2 due to natural convection caused by cooling through the walls of the heating chamber 1, thus enhancing the air-shield effect produced by the inlet air-shield chamber 1.

It is also possible to operatively associate the conveyor and the infrared heater with each other. In such a case, the infrared heater is not operated when the operation of the conveyor is suspended, so that the temperature inside the inlet air-shield chamber can be lowered. This effectively prevent scorching of the object in the event that the conveyor is accidentally stopped with the objects remaining in the inlet air-shield chamber.

The infrared heater starts to operate simultaneously with the start up of the conveyor. The heating is heating temperature is recovered shortly because the heating relies upon infrared radiation.

As has been described, according to the present invention, it is possible to heat the object to be coated and the layer of the coating powder to the reaction or fusion temperature while they are still in the inlet air-shield chamber. This enables elimination of the upstream end portion of the horizontal heating chamber in the conventional oven which has been used for heating the object and the coating powder up to the reaction or fusing temperature. Consequently, the overall length and the heat-radiation area of the oven are decreased to remarkably reduce the production and running costs of the oven.

The use of infrared heater in the inlet air-shield chamber offers the following advantages, due to characteristics peculiar thereto. Namely, when the wavelength of the infrared rays is determined to maximize the absorption, the rays can efficiently heat not only the layer of the coating powder but also the object covered by the coating powder layer, despite the presence of numerous minute voids among the particles of the coating powder. Thus, the infrared radiation offers a higher heating efficiency than conventional heating relying upon convection of hot air, particularly when the coating powder layer has numerous voids which generally function as heat insulators to impede conduction of heat.

The hating in the horizontal heating chamber is conducted by convection of hot air so that the heat can be transferred to every portions of the object even when the object has a complicated delicate configuration, so that the entire portion of the object can be maintained uniformly at the required temperature. It is therefore possible to form a uniform and strong coating film over the entire surface of the object regardless of the configuration of the object.

What is claimed is:

1. An elevated oven, having enclosed up and down ramps, for baking a powder coating material to the surface of an object, comprising:

a tunnel-like horizontal heating chamber having an inlet and an outlet;

an oblique inlet chamber connected to the inlet of said horizontal heating chamber, said oblique inlet chamber enclosing the up-ramp and preventing leakage of hot air from said horizontal heating chamber by convection;

an oblique outlet chamber connected to the outlet of said horizontal heating chamber, said oblique outlet chamber enclosing the down ramp and preventing hot air in said horizontal heating chamber from leaking out by convection;

a hot air generator connected to said horizontal heating chamber to maintain a baking temperature in said horizontal heating chamber which is hot enough to attach said powder coating material to said object by convection of hot air;

a conveyor arranged along said oblique inlet chamber, said horizontal heating chamber, and said oblique outlet chamber so as to extend through these chambers; and a radiant heat source in said oblique inlet chamber for heating said powder coating material and said object covered by the powder coating material up to the baking temperature during conveyance of said object to said horizontal heating chamber, said source being provided on the inner surface of said oblique inlet chamber.

2. An oven according to claim 1, wherein said radiation heat source is an infrared heater.

3. An oven according to claim 2, wherein said radiant heater includes an infrared unit and said oblique chamber includes a bottom wall, wherein said unit is provided on the inner surface of said bottom wall of said oblique inlet chamber.

4. An oven according to claim 1, wherein said oblique inlet chamber includes side walls, a top wall, and a bottom wall, and said radiant heat source includes a plurality of infrared units, wherein infrared units are provided on the inner surfaces of said side walls, said top wall and said bottom wall of said oblique inlet chamber.

5. An oven according to claim 1, wherein said oblique inlet chamber includes side walls and a bottom wall and said radiant heat source includes a plurality of units, wherein infrared units are provided on the inner surfaces of said side walls and said bottom wall of said inlet air-shield chamber.

6. An oven for baking a powder coating material to the surface of an object, comprising:

a tunnel-like horizontal heating chamber having an inlet and an outlet;

an inlet chamber connected to the inlet of said horizontal heating chamber so as to extend obliquely downwardly therefrom;

an outlet air-shield chamber connected to the outlet end of said horizontal heating chamber so as to extend obliquely downwardly therefrom;

a hot air generator connected to said horizontal heating chamber for maintaining a baking temperature in said horizontal heating chamber which is hot enough to attach the powder coating material to the object by convection of hot air;

a flexible conveyor arranged along the ceilings of said inlet air-shield chamber, said horizontal heating chamber and said outlet air-shield chamber so as to extend through these chambers; and a radiant heat source for heating of the powder coating powder material and the object covered by the powder coating material up to the baking temperature during conveyance of the object to said horizontal heating chamber, said radiant heat source being provided on the inner surface of said inlet air-shield chamber, said radiant heat source being an infrared heater;

wherein units of said infrared heater are provided on the inner surfaces of each both side wall, a top wall and a bottom all of said inlet air-shield chamber; and a heat-resistant protective net disposed along the top side of said radiation heat source provided on the bottom wall of said inlet air-shield chamber.

7. An oven for baking a powder coating material to the surface of an object, comprising:

a tunnel-like horizontal heating chamber having an inlet and an outlet;

an inlet chamber connected to the inlet of said horizontal heating chamber so as to extend obliquely downwardly therefrom;

an outlet air-shield chamber connected to the outlet end of said horizontal heating chamber so as to extend obliquely downwardly therefrom;

a hot air generator connected to said horizontal heating chamber for maintaining a baking temperature in said horizontal heating chamber which is hot enough to attach the powder coating material to the object by convection of hot air;

a flexible conveyor arranged along the ceilings of said inlet air-shield chamber, said horizontal heating chamber and said outlet air-shield chamber so as to extend through these chambers; and a radiant heat source for heating of the powder coating material and the object covered by the powder coating material up to the baking temperature during conveyance of the object to said horizontal heating chamber, said radiant heat source being provided on the inner surface of said inlet air-shield chamber, said radiant heat source being an infrared heater;

wherein units of said infrared heater are provided on the inner surfaces of both side walls and a bottom wall of said inlet air-shield chamber; and a heat-resistant protective net disposed along the top side of said radiation heat source provided on the bottom surface of said inlet air-shield chamber.

8. An oven for baking a powder coating material to the surface of an object, comprising:

a tunnel-like horizontal heating chamber having an inlet and an outlet;

an inlet chamber connected to the inlet of said horizontal heating chamber so as to extend obliquely downwardly therefrom;

an outlet air-shield chamber connected to the outlet end of said horizontal heating chamber so as to extend obliquely downwardly therefrom;

a hot air generator connected to said horizontal heating chamber for maintaining a baking temperature in said horizontal heating chamber which is hot enough to attach the powder coating material to the object by convection of hot air;

a flexible conveyor arranged along the ceilings of said inlet air-shield chamber, said horizontal heating chamber and said outlet air-shield chamber so as to extend through these chambers; and a radiant heat source for heating of the powder coating material and the object covered by the powder coating material up to the baking temperature during conveyance of the object to said horizontal heating chamber, said radiant heat source being provided on the inner surface of said inlet air-shield chamber, said radiant heat source being an infrared heater;

wherein a unit of said infrared heater is provided on the inner surface of a bottom wall of said inlet air-shield chamber; and a heat-resistant protective net disposed along the top side of said radiation heat source provided on the bottom surface of said inlet air-shield chamber.

9. An elevated oven for baking a powder coating material to the surface of an object, comprising:

a horizontal heating chamber having an inlet and an outlet;

a hot air generator connected to said horizontal heating chamber to provide hot air to said heating chamber for maintaining said object at a baking temperature which is hot enough to attach the powder baking material to the object by convection of hot air; and an inlet air-shield chamber connected to and extending obliquely from said said inlet of said horizontal heating chamber for receiving said object prior to said object being baked in said horizontal heating chamber, said inlet chamber including a radiant heat source carried on an inner surface thereof whereby said radiant heat source heats said powder coating material to substantially the baking temperature in said inlet chamber prior to said powder coating material and said object being baked in said heating chamber by convection of hot air from said hot air generator.

* * * * *

UNITED STATES PATENT AND TRADEMARK OFFICE
CERTIFICATE OF CORRECTION

PATENT NO. : 5,155,335
DATED : October 13, 1992
INVENTOR(S) : Habaki et al.

It is certified that error appears in the above-identified patent and that said Letters Patent is hereby corrected as shown below:

Column 1, line 25;
After "operation" delete --the-- (second occurrence).

Column 2, line 66;
"hating" should be --heating--.

Column 4, line 19;
After "The heating" delete --is heating--.

Column 4, line 47;
"hating" should be --heating--.

Column 6, line 1;
"bottom all" should be --bottom wall--.

Signed and Sealed this
Sixteenth Day of November, 1993

Attest:

Bruce Lehman

BRUCE LEHMAN

*Attesting Officer*

*Commissioner of Patents and Trademarks*